(12) United States Patent
Wakizaka et al.

(10) Patent No.: US 9,263,733 B2
(45) Date of Patent: Feb. 16, 2016

(54) ANODE FOR USE IN A LITHIUM-ION SECONDARY BATTERY, AND LITHIUM-ION SECONDARY BATTERY

(75) Inventors: Yasuhiro Wakizaka, Tokyo (JP); Kei Kobayashi, Tokyo (JP)

(73) Assignee: Zeon Corporation, Tokyo (JP)

( * ) Notice: Subject to any disclaimer, the term of this patent is extended or adjusted under 35 U.S.C. 154(b) by 309 days.

(21) Appl. No.: 13/496,761

(22) PCT Filed: Sep. 22, 2010

(86) PCT No.: PCT/JP2010/066421
§ 371 (c)(1),
(2), (4) Date: Mar. 16, 2012

(87) PCT Pub. No.: WO2011/037142
PCT Pub. Date: Mar. 31, 2011

(65) Prior Publication Data
US 2012/0189913 A1    Jul. 26, 2012

(30) Foreign Application Priority Data
Sep. 25, 2009    (JP) ................................ 2009-220362

(51) Int. Cl.
| | |
|---|---|
| H01M 4/02 | (2006.01) |
| H01M 4/133 | (2010.01) |
| H01M 4/134 | (2010.01) |
| H01M 4/36 | (2006.01) |
| H01M 4/62 | (2006.01) |
| H01M 10/0525 | (2010.01) |
| H01M 4/1393 | (2010.01) |
| H01M 4/1395 | (2010.01) |

(52) U.S. Cl.
CPC .............. *H01M 4/133* (2013.01); *H01M 4/134* (2013.01); *H01M 4/364* (2013.01); *H01M 4/621* (2013.01); *H01M 4/622* (2013.01); *H01M 10/0525* (2013.01); *H01M 4/1393* (2013.01); *H01M 4/1395* (2013.01); *Y02E 60/122* (2013.01)

(58) Field of Classification Search
CPC ....................................................... H01M 4/62
See application file for complete search history.

(56) References Cited

U.S. PATENT DOCUMENTS

| | | | |
|---|---|---|---|
| 6,300,013 B1 | 10/2001 | Yamada et al. | |
| 6,436,573 B1 | 8/2002 | Goto et al. | |
| 2006/0022198 A1 | 2/2006 | Aramata et al. | |
| 2006/0102474 A1 | 5/2006 | Sato et al. | |
| 2006/0105242 A1 | 5/2006 | Sato et al. | |
| 2007/0065720 A1 | 3/2007 | Hasegawa et al. | |
| 2007/0092796 A1 | 4/2007 | Matsuda et al. | |
| 2008/0014496 A1* | 1/2008 | Watanabe et al. | 429/129 |
| 2010/0009258 A1 | 1/2010 | Hasegawa et al. | |
| 2010/0310942 A1* | 12/2010 | Watanabe et al. | 429/330 |

FOREIGN PATENT DOCUMENTS

| | | |
|---|---|---|
| CN | 1272698 A | 11/2000 |
| CN | 1507093 A | 6/2004 |
| CN | 1758466 A | 4/2006 |
| CN | 100433416 C | 11/2008 |
| JP | 11-354125 A | 12/1999 |
| JP | 2000-299108 A | 10/2000 |
| JP | 2000-357515 A | 12/2000 |
| JP | 2002-319402 A | 10/2002 |
| JP | 2006-107767 * | 4/2006 |
| JP | 2006-107767 A | 4/2006 |
| JP | 2006-164952 A | 6/2006 |
| JP | 2006-339093 A | 12/2006 |
| JP | 2007-115871 A | 5/2007 |
| JP | 2008-277231 A | 11/2008 |
| JP | 2008-287932 A | 11/2008 |
| KR | 10-2006-0048900 A | 5/2006 |
| KR | 10-2006-0054138 A | 5/2006 |
| WO | WO 2006/075446 A1 | 7/2006 |

OTHER PUBLICATIONS

Chinese Office Action issued in corresponding Chinese Patent Application 201080042719.1 dated Aug. 29, 2014.
International Search Report for PCT/JP2010/066421 dated Dec. 7, 2010.
Chinese Office Action and Search Report for Chinese Application No. 201080042719.1, dated Mar. 10, 2015.
Korean Office Action dated Jul. 20, 2015 issued in corresponding Korean Patent Application No. 10-2012-7007650.
Korean Office Action dated Nov. 18, 2015, issued in corresponding Korean Patent Application No. 10-2012-7007650.

* cited by examiner

*Primary Examiner* — Jacob Marks
(74) *Attorney, Agent, or Firm* — Birch, Stewart, Kolasch & Birch, LLP

(57) ABSTRACT

A negative electrode for a lithium ion secondary battery including an active material layer that is disposed on a current collector and that contains a negative electrode active material and a binder, in which the negative electrode active material includes an alloy active material and a carbon active material, and the weight ratio between the alloy active material and the carbon active material in the active material layer is 20:80 to 50:50, and the binder contains 0.1 to 15 wt % of an ethylenically unsaturated carboxylic acid monomer polymerization unit.

6 Claims, No Drawings

ANODE FOR USE IN A LITHIUM-ION SECONDARY BATTERY, AND LITHIUM-ION SECONDARY BATTERY

TECHNICAL FIELD

The present invention relates to a negative electrode for a lithium ion secondary battery and a lithium ion secondary battery including this negative electrode.

BACKGROUND ART

The recent spread of handheld terminal devices such as laptop computers, cellular phones, and PDAs has been remarkable. As the secondary battery power source in these handheld terminal devices, a non-aqueous electrolyte secondary battery, such as a lithium ion secondary battery (hereinafter sometimes referred to simply as a "battery") is often used. Handheld terminal devices need to have a comfortable portability, and thus such devices are rapidly becoming more compact, thinner, and lightweight with better performance. Consequently, handheld terminal devices are now being used in a wide variety of situations. Further, similar to handheld terminal devices, other batteries now used as a power source due to the expansion of how devices are used also need to be more compact, thinner, and lightweight with better performance. Therefore, there is a need for batteries to have a greater capacity.

Therefore, attempts to improve the performance of the various parts and materials in lithium secondary batteries are actively being pursued. Among such efforts, battery capacity improvement resulting from the negative electrode active material is becoming more important.

As the negative electrode active material, currently, carbon active materials such as graphite are mainly employed, whereby a discharge capacity of about 350 to 360 mAh/g, which is close to the theoretical capacity for graphite of 372 mAh/g, is realized. However, it is impossible to exceed the theoretical capacity of graphite. In view of this limit due to the theoretical capacity of graphite, research has been carried out into metals capable of storing Li. As a result, it has been found out that a high theoretical capacity can be achieved with an alloy active material of silicon, tin, zinc, aluminum, gallium, copper, silver, germanium, indium and the like. Among these, silicon has a far greater theoretical capacity of 4,200 mAh/g, although the adhesion strength of the electrode is disadvantageously lowered due to the expansion and contraction that occurs during charging and discharging. Consequently, the negative electrode materials degrade, which shortens the cycle life of the battery. Thus, in order to increase the discharge capacity and improve the cycle property as well, alloy active materials have been proposed which are a mixture of silicon and graphite powder, or are formed by adhering a silicon powder on the surface of a carbon powder or a graphite powder by mixing a carbon powder or graphite powder with a silicon powder, and then coating pitch on the resultant surface.

For example, Patent Document 1 has proposed use of a negative electrode obtained using a slurry obtained by dispersing a silicon compound and a carbon material in a binder such as polyester. In Patent Document 1, the binder offsets the volume changes of the silicon compound negative electrode during doping and undoping of lithium, which suppresses the volume changes of the whole active material layer, thereby suppressing cycle deterioration.

Further, Patent Document 2 has proposed a negative electrode material for a lithium secondary battery that includes silicon particles and a plurality of types of carbonaceous material, and that has voids. As the plurality of types of carbonaceous material, Patent Document 2 discloses a carbonaceous material A having a comparatively high level of electron conductivity selected from graphite, carbon black, carbon nanotubes, carbon fibers and the like, and a carbonaceous material B, which is an amorphous carbon selected from a pitch-based material, a tar-based material, a resin-based material and the like. In Patent Document 2, the carbonaceous material B or a precursor of the carbonaceous material B, silicon particles, and the carbonaceous material A are mixed with a twin-screw heating kneader or the like, and then thermally treating the resultant mixture to obtain composite particles. Using these particles as the negative electrode material, the expansion and contraction of the silicon that occurs during charging and discharging is alleviated, whereby the aforementioned cycle property problem is diminished.

PRIOR ART REFERENCES

Patent Documents

Patent Document 1: Japanese Patent Application Laid-Open No. 2000-299108 A
Patent Document 2: Japanese Patent Application Laid-Open No. 2008-277231 A

SUMMARY OF THE INVENTION

Problem to be Solved by the Invention

However, in Patent Document 1, the carbon material is added at a high mixing ratio relative to the silicon compound, and use of a binder such as polyester causes insufficient dispersion of the carbon material, and also causes uneven distribution in the electrode. Consequently, the binder cannot absorb the expansion and contraction of the localized silicon compound in the electrode, which in turn causes pulverization of the silicon compound. As a result, the resistance in the electrode increases to cause deterioration in cycle property. In addition, as most of the silicon alloy active material particles have an angular shape, use of such active material tends to cause decrease in adhesion force among the particles during the rolling step of the electrode plate. This tendency is particularly noticeable for an electrode having an active material layer density of 1.6 g/cm$^3$ or more.

In Patent Document 2, cycle property is realized by existence of voids in the composite particles made of silicon particles and carbonaceous materials. However, although the cycle property is improved thereby, the battery capacity per unit volume tends to decrease. Further, in Patent Document 2, the negative electrode material is obtained by mixing the silicon particles and carbonaceous materials, heat treating the mixture to produce composite particles, then removing impurities by shifting and application of hydrochloric acid, and filtering and vacuum drying. Thus, the production includes an increased number of steps, which elevates production costs.

Further, when producing the electrode slurry, submicron-size carbon material can leave the composite particles. This carbon material can form structures in the slurry with the binder, causing the problem of an increase in the slurry viscosity.

Therefore, it is an object of the present invention to provide a negative electrode for a lithium ion secondary battery, and a slurry for such a lithium ion secondary battery negative electrode, capable of providing a lithium ion secondary battery that can suppress deterioration in the electrode adhesion strength and has a low degree of life deterioration even without compositing the active material.

Means for Solving the Problem

As a result of diligent research, the present inventors have found out that, when producing a negative electrode for a lithium ion secondary battery that includes an active material layer which is disposed on a current collector and which contains a negative electrode active material and a binder, use of a mixture of an alloy active material and a carbon active material in a predetermined ratio as an electrode active material and use a binder having a specific functional group can result in improvement in the stability of the binder in the slurry mixture and suppression of an increase in the slurry viscosity. Further, the present inventors have also found out that the number of attachment points among the alloy active material particles can be reduced by making a carbon active material be present in the system. In addition, the present inventors have found out that presence of a predetermined amount of a specific functional group in the binder can suppress deterioration of the adhesion inside the active material layer and the adhesion between the active material layer and the current collector (i.e., deterioration in the adhesion strength of the electrode), alleviates the expansion and contraction of the alloy active material in the battery, and reduces the internal resistance of the negative electrode, whereby the life property of the obtained lithium ion secondary battery is improved.

That is, the present invention, which resolves the aforementioned problems, includes the following features as gist.
(1) A negative electrode for a lithium ion secondary battery comprising a current collector; and an active material layer which is disposed on the current collector and which contains a negative electrode active material and a binder, wherein the negative electrode active material includes an alloy active material and a carbon active material, and a weight ratio between the alloy active material and the carbon active material in the active material layer is 20:80 to 50:50, and the binder contains 0.1 to 15 wt % of an ethylenically unsaturated carboxylic acid monomer polymerization unit.
(2) The negative electrode for a lithium ion secondary battery according to the aforementioned (1), wherein the active material layer further includes 1 to 20 parts by weight of a conductive material based on 100 parts by weight of the active material.
(3) The negative electrode for a lithium ion secondary battery according to the aforementioned (1) or (2), wherein the binder has a glass transition temperature of 25° C. or lower.
(4) The negative electrode for a lithium ion secondary battery according to any of the aforementioned (1) to (3), wherein the active material layer has a density of 1.6 to 1.9 g/cm$^3$.
(5) A slurry for a lithium ion secondary battery negative electrode, comprising a negative electrode active material, a binder, and a solvent, wherein the negative electrode active material includes an alloy active material and a carbon active material, a weight ratio between the alloy active material and the carbon active material is 20:80 to 50:50, and the binder contains 0.1 to 15 wt % of an ethylenically unsaturated carboxylic acid monomer polymerization unit.
(6) A lithium secondary battery comprising a positive electrode, a negative electrode, a separator, and an electrolyte solution, wherein the negative electrode is the negative electrode for a lithium ion secondary battery according to any of the aforementioned (1) to (5).

Effect of the Invention

According to the present invention, by using a slurry obtained by mixing an active material formed by mixing an alloy active material and a carbon active material in a weight ratio of 20:80 to 50:50 (weight ratio), a binder that contains 0.1 to 15 wt % of ethylenically unsaturated carboxylic acid monomer polymerization units, and a solvent, the alloy active material and the carbon active material can be uniformly distributed in the active material layer. Consequently, the number of attachment points among the alloy active material particles is reduced, and the binder acquires the polymerization units of the ethylenically unsaturated carboxylic acid monomer, whereby the adhesion strength inside the active material layer and the adhesion strength between the active material layer and the current collector, i.e., the adhesion strength of the electrode, improve. In addition, since the expansion and contraction of the alloy active material is alleviated by the carbon active material, and the internal resistance of the negative electrode is decreased, a battery having a low degree of life deterioration can be obtained.

Embodiments of the Invention

The present invention will now be described hereinbelow.
(Slurry for Lithium Ion Secondary Battery Negative Electrode)

The slurry for a lithium ion secondary battery negative electrode of the present invention contains a negative electrode active material, a binder, and a solvent. The slurry contains, as the negative electrode active material, an alloy active material and a carbon active material.
(Alloy Active Material)

The term "alloy active material" used in the present invention refers to an active material that includes in its structure an element into which lithium can be intercalated, and has a theoretical electrical capacitance based on weight when lithium is intercalated thereinto of 500 mAh/g or more (although the upper limit of the theoretical electrical capacitance is not particularly limited, for example, the upper limit may be set at 5,000 mAh/g or less). Specific examples of materials for use may include lithium metal, elemental metals that forms a lithium alloy, and alloys thereof, and oxides, sulfides, nitrides, silicides, carbides, phosphides and the like thereof.

Examples of elemental metals that forms a lithium alloy and alloys thereof may include compounds containing a metal such as Ag, Al, Ba, Bi, Cu, Ga, Ge, In, Ni, P, Pb, Sb, Si, Sn, Sr, and Zn. Among these, an elemental metal of silicon (Si), tin (Sn), or lead (Pb) or an alloy containing these atoms, or a metal compound thereof, may be used.

The alloy active material used in the present invention may further contain one or more non-metallic elements. Specifically, examples thereof may include SiC, $SiO_xC_y$ (hereinafter referred to as "Si—O—C") ($0<x\leq3$, $0<y\leq5$), $Si_3N_4$, $Si_2N_2O$, $SiO_x$ ($0<x\leq2$), $SnO_x$ ($0<x\leq2$), LiSiO, and LiSnO. Among these, preferred is $SiO_xC_y$ into which lithium intercalation/deintercalation can be performed at a low electric potential. $SiO_xC_y$ may be obtained by, for example, firing a polymer material that contains silicon. Among examples of $SiO_xC_y$, from the perspective of achieving a balance between capacity and the cycle property, it is preferred to use a material in the ranges of $0.8\leq x\leq3$ and $2\leq y\leq4$.

Examples of the oxides, sulfides, nitrides, silicides, carbides, and phosphides may include oxides, sulfides, nitrides, silicides, carbides, phosphides and the like of an element, into which lithium can be intercalated. Among these, oxides are particularly preferred. Specifically, oxides such as tin oxide, manganese oxide, titanium oxide, niobium oxide, and vanadium oxide, and lithium-containing metal composite oxide materials that contain a metal element selected from the group consisting of Si, Sn, Pb, and Ti atoms are being used. Examples of silicon oxides may include materials such as silicon carbide (Si—O—C).

Examples of lithium-containing metal composite oxides may include lithium titanium composite oxides represented by $Li_xTi_yM_zO_4$ ($0.7 \leq x \leq 1.5$, $1.5 \leq y \leq 2.3$, $0 \leq z \leq 1.6$, and M represents Na, K, Co, Al, Fe, Ti, Mg, Cr, Ga, Cu, Zn and Nb). Particularly, $Li_{4/3}Ti_{5/3}O_4$, $Li_1Ti_2O_4$, and $Li_{4/5}Ti_{11/5}O_4$ may be used.

Among these, a material including silicon is preferred, and Si—O—C is particularly preferred. In this compound, it is thought that lithium intercalation/deintercalation into/from Si (silicon) occurs at a high electric potential and into/from C (carbon) occurs at a low electric potential. Thus, with this material, suppression of expansion and contraction occurs to a greater extent than with other alloy active materials. Therefore, the advantageous effects of the present invention can be obtained to the greater extent.

The volume mean particle diameter of the alloy active material used in the present invention is preferably 0.1 to 50 μm, more preferably 0.5 to 20 μm, and most preferably 1 to 10 μm. The alloy active material having a mean particle diameter within this range can facilitate production of the electrode slurry which will be explained later.

(Carbon Active Material)

The term "carbon active material" used in the present invention refers to an active material having carbon as a main skeleton, into which lithium can be intercalated. Specific examples thereof may include a carbonaceous material and a graphitic material. The carbonaceous material is a carbon material having a low degree of graphitization (low crystallinity) that is in general formed by heat treating (carbonizing) a carbon precursor at 2,000° C. or lower (although the lower limit of the treatment temperature is not particularly limited, it may be set at, e.g., 500° C. or higher). The graphitic material is a material having a high degree of crystallinity close to that of graphite that is obtained by heat treating easily-graphitizable carbon at 2,000° C. or higher (although the upper limit of the treatment temperature is not particularly limited, it may be set at, e.g., 5,000° C. or higher).

Examples of the carbonaceous material may include easily-graphitizable carbon whose carbon structure readily changes depending on the heat treatment temperature, and non easily-graphitizable carbon that is not easily graphitized and that has a nearly amorphous structure, as represented by glassy carbon.

Examples of easily-graphitizable carbon may include carbon materials produced with tar pitch that has been obtained from petroleum or coal, such as coke, meso-carbon microbeads (MCMB), mesophase pitch-based carbon fibers, and pyrolytic vapor-grown carbon fibers. MCMB are carbon microparticles obtained by separating and extracting mesophase spherules that have been formed in the course of heating a pitch at around 400° C. Mesophase pitch-based carbon fibers are carbon fibers produced with mesophase pitch that has been obtained by growing and coalescence of the mesophase spherules.

Examples of the non easily-graphitizable carbon may include a sintered product of phenolic resin, polyacrylonitrile carbon fibers, quasi-isotropic carbon, and sintered product of a furfuryl alcohol resin (PFA).

Examples of the graphitic material may include natural graphite and synthetic graphite. Typical examples of synthetic graphite may include synthetic graphite obtained by heat treating at 2,800° C. or higher, graphitized MCMB obtained by heat treating MCMB at 2,000° C. or higher, and graphitized mesophase pitch-based carbon fiber obtained by heat treating mesophase pitch-based carbon fiber at 2,000° C. or higher.

Even among carbon active materials, a graphitic material is preferred. Employment of a graphitic material may facilitate production of an active material layer of the negative electrode having a high density, which in turn facilitates production of a negative electrode having an active material layer density of 1.6 g/cm$^3$ or more (although the upper limit of this density is not particularly limited, the density may be 2.2 g/cm$^3$ or lower). If the negative electrode has an active material layer with a density within this range, the effects of the present invention are remarkably obtained.

The volume mean particle diameter of the carbon active material used in the present invention is preferably 0.1 to 100 μm, more preferably 0.5 to 50 μm, and most preferably 1 to 30 μm. If the carbon active material has a mean particle diameter within this range, production of the electrode slurry, which will be described later, will be facilitated.

Examples of the method for mixing the alloy active material and the carbon active material may include dry mixing and wet mixing. From the perspective of preventing preferential absorption of the binder onto one of the active materials, dry mixing is preferred.

The term "dry mixing" as used herein refers to mixing of powders of the alloy active material and powders of the carbon active material with a mixer, specifically refers to mixing with a solid component content during the mixing of 90 wt % or more, preferably 95 wt % or more, and more preferably 97 wt % or more. If the solid component content during the mixing is in the aforementioned range, uniform dispersion can be achieved while maintaining the shape of the particles, whereby agglomeration of the active materials can be prevented.

Examples of the mixer for performing dry mixing may include a dry tumbler, a super mixer, a Henschel mixer, a flash mixer, an air blender, a flow jet mixer, a drum mixer, a ribbon cone mixer, a pug mixer, a nauta mixer, a ribbon mixer, a spartan granulator, a Loedige mixer, and a planetary mixer, as well as apparatuses such as a screw-type kneader, a defoaming kneader, and a paint shaker, and kneaders such as a pressure kneader, and a two-roll kneader.

Among the aforementioned methods, those that can be carried out in a relatively easy manner may be those using a mixer such as a planetary mixer that can achieve dispersion by stirring. A planetary mixer and a Henschel mixer are particularly preferred.

The mixing ratio of the alloy active material and the carbon active material is 20:80 to 50:50, and preferably 20:80 to 40:60 on the basis of the weight ratio. Mixing of the alloy active material and the carbon active material in the aforementioned range enables production of a battery that has a larger capacity than that of a battery with a prior art electrode that is obtained using only a conventional carbon active material, and solves problems such as deterioration in the adhesion strength of the electrode and in the cycle property.

(Binder)

The binder used in the present invention contains 0.1 to 15 wt % of ethylenically unsaturated carboxylic acid monomer polymerization units. Since the binder for use in the present invention contains 0.1 to 15 wt % of the ethylenically unsaturated carboxylic acid monomer polymerization units, the stability of the binder is maintained, an increase in the viscosity of the slurry over the lapse of time is suppressed, and the adhesion strength of the electrode is improved.

In the present application, the term "polymerization unit" of a certain monomer means the polymerization unit in the polymer formed by a polymerization reaction of that monomer. To give a specific example, the "acrylic acid polymerization unit" in a polyacrylic acid is the unit —($CH_2$—CH(COOH))—.

If the ethylenically unsaturated carboxylic acid monomer polymerization unit content in the binder used in the present invention is less than 0.1 wt %, the aforementioned effects are not exerted. If the ethylenically unsaturated carboxylic acid monomer polymerization unit content is more than 15 wt %, moisture in the binder is used for hydration of the carboxylic acid groups, which causes a significant increase in the viscosity of the binder itself. Consequently, the viscosity of the slurry is increased, and the adhesion strength of the active material layer to the current collector is hindered.

The containing amount of the ethylenically unsaturated carboxylic acid monomer polymerization units in the binder used in the present invention is preferably 0.5 to 10 wt %, and more preferably 1 to 5 wt %. By setting the content of the ethylenically unsaturated carboxylic acid monomer polymer units in the binder within the aforementioned range, the stability of the binder is maintained, the increase in the viscosity of the slurry over the lapse of time is suppressed, and the adhesion strength of the electrode is improved.

Examples of the ethylenically unsaturated carboxylic acid monomer may include acrylic acid, methacrylic acid, itaconic acid, and fumaric acid. Among these, from the perspective of easily disposing a functional group on the surface of the binder, preferred are acrylic acid and itaconic acid.

The ethylenically unsaturated carboxylic acid monomer polymerization units may be introduced by using an ethylenically unsaturated carboxylic acid monomer as a monomer constituting the binder, which will be described later.

The binder is a solution or a dispersion in which binder (polymer) particles having a binding property are dissolved or dispersed in water or an organic solvent (hereinafter these may be collectively referred to as a "binder dispersion"). If the binder dispersion is water-based, the binder dispersion is usually a polymer particle dispersion, and examples thereof may include a diene polymer particle dispersion, an acrylic polymer particle dispersion, a fluoropolymer particle dispersion, and a silicon polymer particle dispersion. Among these, a diene polymer particle dispersion and an acrylic polymer particle dispersion are preferred, because these have an excellent binding property with the active material and these give excellent strength and flexibility to the resulting negative electrode. Since a diene polymer particle dispersion and an acrylic polymer particle dispersion have a high binding property with the active material, use of these dispersions results in less tendency of, e.g., peeling of the negative electrode. Consequently, peeling of the binder caused by expansion and contraction of the active material during charge and discharge occurs less easily, whereby peeling of the active material from the current collector can be prevented, and an increase in the resistance of the negative electrode can therefore be suppressed. Consequently, a high cycle property can be exhibited.

The diene polymer particle dispersion is an aqueous dispersion of a polymer containing monomer units formed by polymerizing a conjugated diene, such as butadiene and isoprene. In the diene polymer, the ratio of the monomer units formed by polymerizing a conjugated diene is usually 40 wt % or more, preferably 50% wt % or more, and more preferably 60 wt % or more. Examples of the diene polymer may include copolymers of a conjugated diene, an ethylenically unsaturated carboxylic acid monomer, and a monomer copolymerizable therewith. Examples of the copolymerizable monomer may include $\alpha,\beta$-unsaturated nitrile compounds such as acrylonitrile and methacrylonitrile; styrenic monomers such as styrene, chlorostyrene, vinyl toluene, t-butyl styrene, vinyl benzoate, methyl vinyl benzoate, vinyl naphthalene, chloromethylstyrene, hydroxymethylstyrene, $\alpha$-methylstyrene, and divinyl benzene; olefins such as ethylene and propylene; halogen atom-containing monomers such as vinyl chloride and vinylidene chloride; vinyl esters such as vinyl acetate, vinyl propionate, vinyl butyrate, and vinyl benzoate; vinyl ethers such as methyl vinyl ether, ethyl vinyl ether, and butyl vinyl ether; vinyl ketones such as methyl vinyl ketone, ethyl vinyl ketone, butyl vinyl ketone, hexyl vinyl ketone, and isopropenyl vinyl ketone; and heterocycle-containing vinyl compounds such as N-vinyl pyrrolidone, vinyl pyridine, and vinyl imidazole. Among these, $\alpha,\beta$-unsaturated nitrile compounds and styrenic monomers are preferred, and styrenic monomers are particularly preferred. The ratio of polymerization units derived from these copolymerizable monomers is preferably 5 to 70 wt %, and more preferably 10 to 60 wt %.

The acrylic polymer particle dispersion is an aqueous dispersion of a polymer containing monomer units formed by polymerizing an acrylic acid ester and/or a methacrylic acid ester. In the acrylic polymer, the ratio of the monomer units formed by polymerizing an acrylic acid ester and/or a methacrylic acid ester is usually 40 wt % or more, preferably 50% wt % or more, and more preferably 60 wt % or more. Examples of the acrylic polymer may include copolymers of an acrylic acid ester and/or a methacrylic acid ester, an ethylenically unsaturated carboxylic acid monomer and a monomer copolymerizable therewith. Examples of the copolymerizable monomer may include carboxylic acid ester monomers having two or more carbon-carbon double bonds such as ethylene glycol dimethacrylate, diethylene glycol dimethacrylate, and trimethylolpropane triacrylate; styrenic monomers such as styrene, chlorostyrene, vinyl toluene, t-butyl styrene, vinylbenzoate, methyl vinylbenzoate, vinyl naphthalene, chloromethylstyrene, hydroxymethylstyrene, $\alpha$-methylstyrene, and divinyl benzene; amido monomers such as acrylamide, N-methylolacrylamide, and acrylamide-2-methylpropanesulfonic acid; $\alpha,\beta$-unsaturated nitrile compounds such as acrylonitrile and methacrylonitrile; olefins such as ethylene and propylene; diene monomers such as butadiene and isoprene; halogen atom-containing monomers such as vinyl chloride and vinylidene chloride; vinyl esters such as vinyl acetate, vinyl propionate, vinyl butyrate, and vinyl benzoate; vinyl ethers such as methyl vinyl ether, ethyl vinyl ether, and butyl vinyl ether; vinyl ketones such as methyl vinyl ketone, ethyl vinyl ketone, butyl vinyl ketone, hexyl vinyl ketone, and isopropenyl vinyl ketone; and heterocycle-containing vinyl compounds such as N-vinyl pyrrolidone, vinyl pyridine, and vinyl imidazole. Among these, $\alpha,\beta$-unsaturated nitrile compounds and styrenic monomers are preferred, and $\alpha,\beta$-unsaturated nitrile compounds are particularly preferred. The ratio of polymerization units derived from these copolymerizable monomers is preferably 3 to 50 wt %, and more preferably 5 to 40 wt %.

The binder dispersion used in the present invention preferably has a pH of 7 to 12, and more preferably 8 to 10. If the pH of the binder is within the aforementioned range, the binder exerts an electrostatic repulsion effect, so that the stability of the binder is maintained and an increase in the viscosity of the slurry over the lapse of time is suppressed.

The binder dispersion may be an aqueous binder that contains water as the dispersion medium, or may be a non-aqueous binder that contains an organic solvent as the dispersion medium. From the perspective of environmental burden and dispersibility of the conductive material, an aqueous binder is preferred.

The aqueous binder may be produced by, for example, emulsion polymerization of the aforementioned monomers in water. Further, the non-aqueous binder may be produced by substituting the aforementioned aqueous binder with an organic solvent. The number mean particle diameter of the binder particles in the binder dispersion is preferably 50 nm to 500 nm, and more preferably 70 to 400 nm. If the number mean particle diameter of the binder particles is within this range, the strength and flexibility of the resulting negative electrode become favorable.

In the present invention, the binder preferably has a glass transition temperature of 25° C. or lower, more preferably −100° C. to +25° C., and even more preferably −80° C. to +10° C., and the most preferably −80° C. to 0° C. When the binder has a glass transition temperature in this range, a very good balance among properties such as the flexibility, binding property, and windability of the negative electrode, and the adhesion between the active material layer and the conductor layer may be preferably obtained. In addition, covering of the surface of the alloy active material particles with the binder can be maintained, whereby peeling of the binder off the active material during the electrode plate pressing process can be suppressed, and deterioration in the adhesion strength can also be suppressed.

The total content of the alloy active material, carbon active material, and binder in the negative electrode slurry of the present invention is preferably 10 to 90 parts by weight, and more preferably 30 to 80 parts by weight, based on 100 parts by weight of the slurry. Further, the content of the binder (solid equivalent) relative to the total amount of alloy active material and carbon active material is preferably 0.1 to 5 parts by weight, and more preferably 0.5 to 2 parts by weight, based on 100 parts by weight of the alloy active material and carbon active material. If the total content of the alloy active material, carbon active material, and binder in the negative electrode slurry and the content of the binder are in the aforementioned ranges, the viscosity of the negative electrode slurry obtained is optimized, and thereby coating can be smoothly carried out. In addition, a sufficient adhesion strength can be obtained in the obtained electrode, without increasing resistance. Consequently, peeling of the binder off the active material during the electrode plate pressing process can be suppressed.

(Solvent)

The solvent is not particularly limited, as long as it can uniformly disperse the aforementioned solid components (the alloy active material, carbon active material, binder, conductive material, thickening agent, and optional components which will be described later).

Both water and an organic solvent may be used as the solvent used for the negative electrode slurry. Examples of the organic solvent may include alicyclic hydrocarbons such as cyclopentane and cyclohexane; aromatic hydrocarbons such as toluene, xylene, and ethylbenzene; ketones such as acetone, ethyl methyl ketone, diisopropyl ketone, cyclohexanone, methyl cyclohexane, and ethyl cyclohexane; chlorinated aliphatic hydrocarbons such as methylene chloride, chloroform, and carbon tetrachloride; esters such as ethyl acetate, butyl acetate, γ-butyrolactone, and ε-caprolactone; acylonitriles such as acetonitrile and propionitrile; ethers such as tetrahydrofuran and ethylene glycol diethyl ether; alcohols such as methanol, ethanol, isopropanol, ethylene glycol, and ethylene glycol monomethyl ether; and amides such as N-methylpyrrolidone and N,N-dimethylformamide.

One species of these solvents may be solely used, or two or more of them may be mixed and used as a mixed solvent. Among these, highly volatile solvents having a low boiling point are preferred, because such solvents can be removed rapidly and at a low temperature. Specifically, preferred are acetone, toluene, cyclohexanone, cyclopentane, tetrahydrofuran, cyclohexane, xylene, water, N-methylpyrrolidone, or mixed solvents thereof.

(Thickening Agent)

The negative electrode slurry of the present invention may further contain a thickening agent. Examples of the thickening agent may include cellulose polymers such as carboxymethyl cellulose, methylcellulose, and hydroxypropyl cellulose, and ammonium salts and alkali metal salts thereof; (modified) poly(meth)acrylic acids and ammonium salts and alkali metal salts thereof; polyvinyl alcohols such as (modified) polyvinyl alcohols, copolymers of acrylic acid or an acrylic acid salt and a polyvinyl alcohol, and copolymers of maleic anhydride, maleic acid, or fumaric acid and a vinyl alcohol; polyethylene glycol, polyethylene oxide, polyvinylpyrrolidone, modified polyacrylic acid, oxidized starch, starch phosphate, casein, a variety of modified starches and the like. It is preferable to use an ammonium salt or alkali metal salt of carboxymethyl cellulose. This is because such a thickening agent has a tendency to uniformly coat the surface of the active materials during production of the slurry, and adhesion among the active materials is thereby improved.

The amount of the thickening agent is preferably 0.5 to 2.0 parts by weight, based on 100 parts by weight of the total amount of the alloy active material and the carbon active material. If the added amount of the thickening agent is in this range, the coating properties and adhesion with the current collector become favorable. In the present invention, "(modified) poly" means either "unmodified poly" or "modified poly," and "(meth)acrylic" means either "acrylic" or "methacrylic".

(Conductive Material)

It is preferable that the negative electrode slurry of the present invention contains a conductive material. Examples of conductive materials for use may include conductive carbons, such as acetylene black, Ketchen black, carbon black, graphite, vapor-grown carbon fibers, and carbon nanotubes. Inclusion of a conductive material can improve electrical contact among the active materials, which enables improvement in the discharge rate property when used in a lithium ion secondary battery. The containing amount of the conductive material in the negative electrode slurry is preferably 1 to 20 parts by weight, and more preferably 1 to 10 parts by weight, based on 100 parts by weight of the total amount of the alloy active material and the carbon active material.

In addition to the aforementioned components, the negative electrode slurry of the present invention may further contain optional components, such as a reinforcing agent, a dispersing agent, a leveling agent, and an electrolyte additive having a function of, e.g., suppressing electrolyte decomposition. Such components may also be contained in the secondary battery negative electrode which will be described later. These components are not particularly limited, as long as they do not affect the battery reactions.

Examples of reinforcing agents for use may include a variety of inorganic and organic fillers in spherical, plate-like, rod-like, or fibrous shape. Use of a reinforcing agent can give a strong and flexible negative electrode which shows an excellent long-term cycle property. The containing amount of the conductive material and reinforcing agent in the negative electrode slurry is usually 0.01 to 20 parts by weight, and preferably 1 to 10 parts by weight, based on 100 parts by weight of the total amount of the alloy active material and the carbon active material. If the content of the conductive material and reinforcing agent is in this range, a high capacity and a high load property can be exhibited.

Examples of the dispersing agent may include anionic compounds, cationic compounds, non-ionic compounds, and polymer compounds. The dispersing agent is selected depending on the type of negative electrode active material and conductive material to be used. The containing amount of the dispersing agent in the negative electrode slurry is preferably 0.01 to 10 parts by weight, based on 100 parts by weight of the total amount of the alloy active material and the carbon active material. If the content of the dispersing agent is in this range, the resulting slurry becomes stable, and a smooth negative electrode can be obtained, whereby a high battery capacity can be exhibited.

Examples of the leveling agent may include surfactants such as alkyl surfactants, silicon surfactants, fluoride surfactants, and metal-based surfactants. Addition of such a leveling agent can prevent repelling that may otherwise occur during coating, and can also improve smoothness of the negative electrode. The containing amount of the leveling agent in the negative electrode slurry is preferably 0.01 to 10 parts by weight, based on 100 parts by weight of the total amount of the alloy active material and the carbon active material. If the content of the leveling agent is in this range, the productivity and smoothness upon producing the negative electrode and the battery property become excellent.

As the electrolyte additive, vinylene carbonate and the like that are used in the negative electrode slurry and in the electrolyte solution may be used. The containing amount of the electrolyte additive in the negative electrode slurry is preferably 0.01 to 10 parts by weight, based on 100 parts by weight of the total amount of the alloy active material and the carbon active material. If the content of the electrolyte additive is in this range, the cycle property and high-temperature property become excellent. Further examples of the electrolyte additive may include nanoparticles of fumed silica and fumed alumina. By the addition of these nanoparticles, the thixotropy of the negative electrode slurry can be controlled, whereby the leveling property of the resulting negative electrode can be improved. The containing amount of the nanoparticles in the negative electrode slurry is preferably 0.01 to 10 parts by weight, based on 100 parts by weight of the total amount of the alloy active material and the carbon active material. If the content of the nanoparticles is in this range, slurry stability and productivity become excellent, and high battery property is exhibited.

(Method for Producing Slurry for Lithium Ion Secondary Battery Negative Electrode)

The slurry for a lithium ion secondary battery negative electrode may be obtained by mixing the aforementioned binder, mixture of the alloy active material and carbon active material, and optionally-used thickening agent, conductive material and the like, in a solvent.

The mixing method is not particularly limited. For example, mixing can be carried out using a stirring-type, shaking-type, or rotation-type mixing apparatus. Further, the mixing may also be carried out using a dispersion kneader, such as a homogenizer, a ball mill, a sand mill, a roll mill, and a planetary kneader.

(Negative Electrode)

The negative electrode for a lithium ion secondary battery of the present invention has a current collector and an active material layer which is disposed on the current collector. The active material layer contains a negative electrode active material and a binder. The negative electrode active material includes an alloy active material and a carbon active material. The weight ratio between the alloy active material and the carbon active material in the active material layer is 20:80 to 50:50. The binder contains 0.1 to 15 wt % of ethylenically unsaturated carboxylic acid monomer polymerization units.

In a preferred embodiment, the negative electrode for a lithium ion secondary battery of the present invention has an active material layer formed by coating and drying the negative electrode slurry of the present invention on the current collector.

The method for producing the negative electrode of the present invention is not particularly limited. An example thereof is to apply the aforementioned negative electrode slurry on at least one surface, and preferably on both surfaces, of the current collector, and then dry the slurry to form an active material layer.

The method for coating the negative electrode slurry on the current collector is not particularly limited. Examples thereof may include a doctor blade method, a dipping method, a reverse roll method, a direct roll method, a gravure method, an extrusion method, and a brush painting method.

Examples of the drying method may include drying with warm air, hot air, or low humidity air, vacuum drying, and irradiation with (far) infrared or electron beam. The drying time is usually 5 to 30 minutes. The drying temperature is usually 40 to 180° C.

In the production of the negative electrode of the present invention, after the application and drying of the negative electrode slurry on the current collector, it is preferable to perform a step of pressure treatment using a metal mold press or a roll press, to thereby reducing the porosity of the active material layer. A preferred porosity range is 5% to 30%, and more preferably 7% to 20%. If the porosity is too high, the charging efficiency and discharging efficiency may deteriorate. If the porosity is too low, it may become difficult to obtain a high volume capacity, and the active material layer easily peels off the current collector, which tends to cause defects.

Further, when using a curable polymer as the binder, it is preferred to cure the polymer.

The thickness of the active material layer of the negative electrode for a lithium ion secondary battery is usually 5 to 300 μm, and preferably 30 to 250 μm, for the positive electrode, and for the negative electrode as well. By setting the negative electrode thickness in this range, a high load property and a high cycle property are exhibited.

In the present invention, the total content of the alloy active material and the carbon active material in the negative electrode active material layer is preferably 85 to 99 wt %, and more preferably 88 to 97 wt %. By setting the total content of the alloy active material and the carbon active material in the negative electrode active material layer in this range, flexibility and a binding property can be obtained together with a high capacity.

In the present invention, it is preferable that the active material layer in the negative electrode for a lithium ion secondary battery has a density of 1.6 to 1.9 g/cm$^3$, and more preferably 1.65 to 1.85 g/cm$^3$. If the density of the negative electrode active material layer is in this range, a high-capacity battery can be obtained.

(Current Collector)

The current collector used in the present invention is not particularly limited, as long as it is a material that is electrically conductive and has electrochemical durability. However, it is preferable that the current collector is a metal material, since such a material has heat resistance. Examples thereof may include iron, copper, aluminum, nickel, stainless steel, titanium, tantalum, gold, and platinum. Among these, copper is particularly preferable for the negative electrode for a lithium ion secondary battery. Although the shape of the current collector is not particularly limited, a sheet shape having a thickness of about 0.001 to 0.5 mm is preferred. It is preferable that the current collector is previously subjected to roughening treatment before use in order to increase the bonding strength with the active material layer. Examples of roughening methods may include mechanical polishing, electropolishing, and chemical polishing. In mechanical polishing, polishing paper to which polishing agent particles are fixed, a grind stone, an emery wheel, and a wire brush having steel wire and the like may be used. Further, an intermediate layer may be formed on the surface of the current collector in order to increase the bonding strength of the mixture formulation and to increase the conductivity.

(Lithium Ion Secondary Battery)

The lithium ion secondary battery of the present invention has a positive electrode, a negative electrode, a separator, and an electrolyte solution, wherein the negative electrode is the aforementioned negative electrode for the secondary battery.

(Electrolyte Solution)

The electrolyte solution used in the present invention is not particularly limited. For example, a solution obtained by dissolving a lithium salt as a supporting electrolyte in a non-aqueous solvent may be used. Examples of the lithium salt may include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. $LiPF_6$, $LiClO_4$, and $CF_3SO_3Li$, which readily dissolve in the solvent and exhibit a high degree of dissociation, are particularly preferably used. One species of these salts may be solely used or a mixture of two or more thereof may also be used. The amount of the supporting electrolyte is usually 1 wt % or more and preferably 5 wt % or more, and usually 30 wt % or less and preferably 20 wt % or less, based on the electrolyte solution. If the amount of the supporting electrolyte is too little or too much, ionic conductivity deteriorates, and the charging property and discharging property of the battery deteriorate.

The solvent used in the electrolyte solution is not particularly limited, as long as it dissolves the supporting electrolyte. However, examples of the solvent usually used may include alkyl carbonates such as dimethyl carbonate (DMC), ethylene carbonate (EC), diethyl carbonate (DEC), propylene carbonate (PC), butylene carbonate (BC), and methylethyl carbonate (MEC); esters such as γ-butyrolactone and methyl formate; ethers such as 1,2-dimethoxyethane and tetrahydrofuran; and sulfur-containing compounds such sulfolane and dimethylsulfoxide. Dimethyl carbonate, ethylene carbonate, propylene carbonate, diethyl carbonate, and methylethyl carbonate are particularly preferred, since high ionic conductivity can be readily obtained with these solvent, and these solvent have a wide usage temperature range. One species of these solvents may be solely used, or a mixture of two or more species thereof may also be used.

It is possible to add an additive to the electrolyte solution for use. As the additive, a carbonate compound, such as vinylene carbonate (VC), is preferred.

Examples of electrolyte solutions other than those described above may include gel polymer electrolytes obtained by impregnating an electrolyte solution in a polymer electrolyte such as polyethylene oxide and polyacrylonitrile, and inorganic solid electrolytes such as lithium sulfide, LiI and $Li_3N$.

(Separator)

The separator is a porous substrate having pores. Examples of separators that can be used may include (a) porous separators having pores, (b) porous separators having a polymer coat layer formed on one surface or both surfaces thereof, and (c) porous separators having a porous resin coat layer formed thereon that contains inorganic ceramic powders. Non-limiting examples thereof may include porous separators of polypropylene, polyethylene, polyolefin, or aramid type, a polymer film for a solid polymer electrolyte or a gel polymer electrolyte made of, e.g., polyvinylidene fluoride, polyethylene oxide, polyacrylonitrile, or polyvinylidene fluoride-hexafluoropropylene copolymer, a separator coated with a gelated polymer coat layer, and a separator coated with a porous membrane layer formed of an inorganic filler and a dispersing agent for an inorganic filler.

(Lithium Ion Secondary Battery Positive Electrode)

The positive electrode for the lithium ion secondary battery is formed by stacking on a current collector a positive electrode active material layer which contains a positive electrode active material and a binder.

(Positive Electrode Active Material)

As the electrode active material (positive electrode active material) for a non-aqueous electrolyte secondary battery positive electrode, an active material that can store and release lithium ions is used. Such positive electrode active materials can be broadly classified into active materials formed of an inorganic compound and active materials formed of an organic compound.

Examples of the positive electrode active materials formed of an inorganic compound may include transition metal oxides, transition metal sulfides, and lithium-containing composite metal oxides of lithium and a transition metal. Examples of such transition metals for use may include Ti, V, Cr, Mn, Fe, Co, Ni, Cu, and Mo.

Examples of transition metal oxides may include MnO, $MnO_2$, $V_2O_5$, $V_5O_{13}$, $TiO_2Cu_2V_2O_3$ amorphous $V_2O$—$P_2O_5$, $MoO_3$, $V_2O_5$, and $V_6O_{13}$. Among these, from the perspectives of cycle stability and capacity, MnO, $V_2O_5$, $V_6O_{13}$, and $TiO_2$ are preferred.

Examples of transition metal sulfides may include $TiS_2$, $TiS_3$, amorphous $MoS_2$, and FeS.

Examples of lithium-containing composite metal oxides may include lithium-containing composite metal oxides having a layered structure, lithium-containing composite metal oxides having a spinel structure, and lithium-containing composite metal oxides having an olivine structure.

Examples of lithium-containing composite metal oxides having a layered structure may include lithium-containing cobalt oxide ($LiCoO_2$), lithium-containing nickel oxide ($LiNiO_2$), lithium composite oxides of Co—Ni—Mn, lithium composite oxides of Ni—Mn—Al, and lithium composite oxides of Ni—Co—Al.

Examples of lithium-containing composite metal oxides having a spinel structure may include lithium manganate ($LiMn_2O_4$), and $Li[Mn_{3/2}M_{1/2}]O_4$ (wherein M represents Cr, Fe, Co, Ni, Cu and the like) in which some Mn are substituted with another transition metal.

Examples of lithium-containing composite metal oxides having an olivine structure may include olivine type lithium phosphate compounds represented by $Li_xMPO_4$ (wherein M represents at least one element selected from Mn, Fe, Co, Ni, Cu, Mg, Zn, V, Ca, Sr, Ba, Ti, Al, Si, B, and Mo, and $0 \leq x \leq 2$).

Examples of organic compounds that can be used may include electroconductive polymers, such as polyacetylene and poly-p-phenylene.

An iron oxide, which has poor electroconductance, can also be used as an electrode active material covered by a carbon material which is produced by reduction firing with the coexistence of a carbon raw material. Further, these compounds may be partially substituted with another element. The positive electrode active material for the lithium ion secondary battery may also be a mixture of the aforementioned inorganic compound and organic compound.

The mean particle diameter of the positive electrode active material is usually 1 to 50 µm, and preferably is 2 to 30 µm. By setting the particle diameter within this range, the amount of the binder for preparing the slurry, which will be described later, can be reduced, whereby capacity lowering of the battery can be suppressed. Further, with the aforementioned mean particle diameter, viscosity of the slurry can be adjusted to be suitable for coating, whereby a uniform electrode can be obtained.

The containing amount of the positive electrode active material in the positive electrode active material layer in the positive electrode is preferably 90 to 99.9 wt %, and more preferably 95 to 99 wt %. By setting the content of the positive electrode active material in the electrode in this range, a high capacity as well as flexibility and a binding property can be obtained.

(Binder for the Lithium Ion Secondary Battery Positive Electrode)

The binder for the lithium ion secondary battery positive electrode is not particularly limited, and a known binder may be used. Examples thereof may include resins such as polyethylene, polytetrafluoroethylene (PTFE), polyvinylidene fluoride (PVDF), tetrafluoroethylene-hexafluoropropylene copolymers (FEP), polyacrylic acid derivatives, and polyacrylonitrile derivatives, which are also used for the aforementioned negative electrode for a lithium ion secondary battery, and flexible polymers such as flexible acrylic polymers, flexible diene polymers, flexible olefin polymers, and flexible vinyl polymers. One species of these binders may be solely used, or two or more species thereof may be used in combination.

In addition to the aforementioned components, the lithium ion secondary battery positive electrode may further contain optional components, such as the dispersing agent and the electrolyte additive having a function such as electrolyte decomposition suppression that are also used in the aforementioned secondary battery negative electrode. Such components are not particularly limited, as long as they do not affect the battery reactions.

The positive electrode for the lithium ion secondary battery is formed by forming on a current collector a positive electrode active material formed of a positive electrode active material and a binder.

As the current collector, the current collector used for the aforementioned secondary battery negative electrode can be used. The current collector is not particularly limited, as long as it is a material that is electrically conductive and has electrochemical durability. However, it is particularly preferred to use aluminum for the lithium ion secondary battery positive electrode.

The thickness of the positive electrode active material layer for the lithium ion secondary battery is usually 5 to 300 µm, and preferably 10 to 250 µm. By setting the thickness of the positive electrode active material layer in this range, a high load property and a high energy density are exhibited.

The positive electrode for a lithium ion secondary battery can be produced in the same manner as the aforementioned negative electrode for a lithium ion secondary battery.

(Battery Production Method)

The method for producing the lithium ion secondary battery of the present invention is not particularly limited. For example, the negative electrode and the positive electrode may be piled with the separator disposed therebetween, and this may be wound, folded etc. in conformity with the shape of the battery, and then placed in a battery casing. Then, an electrolyte solution may be injected into the battery casing, and the casing sealed. If necessary, expanded metal, an over-current protection device such as a fuse and a PTC element, a lead plate and the like may also be disposed to prevent an increase in the internal pressure of the battery, and to prevent overcharge/overdischarge. The shape of the battery may be any of a laminate type, coin type, button type, sheet type, cylinder type, horn shape, and flat type.

EXAMPLES

The present invention will now be described referring to Examples, although the present invention is not limited thereto. Unless otherwise noted, "parts" and "%" in Examples are based on weight.

In Examples and Comparative Examples, properties were evaluated as follows.

(Rate of Slurry Viscosity Change)

The rate of slurry viscosity change was determined from the slurry viscosity 1 hour ($\eta_{1\,h}$) and 5 hours ($\eta_{5\,h}$) after producing the slurry for the electrode using the following equation, and evaluated based on the following criteria.

$$\text{Rate of slurry viscosity change (\%)} = 100 \times (\eta_{5\,h} - \eta_{1\,h}) / (\eta_{1\,h})$$

A: lower than 5%
B: 5% or higher to lower than 10%
C: 10% or higher to lower than 15%
D: 15% or higher to lower than 20%
E: 20% or higher to lower than 25%
F: 25% or higher The slurry viscosity was measured with a single-cylinder rotary viscometer in accordance with JIS Z8803:1991 (25° C., rotational speed=60 rpm, spindle shape: 4).

(Adhesion Strength of Electrode)

Sample pieces of the negative electrode were cut out in a form of rectangle having 1 cm width and 10 cm length. The sample piece was fixed with the surface of the electrode active material layer facing upwards. Cellophane tape was adhered to the electrode active material layer surface of the sample pieces. Then, the cellophane tap was peeled off in a 180° direction from one end of the sample piece at a rate of 50 mm/min, and the stress thereupon was measured. The measurement was carried out 10 times, and the mean value thereof was taken as the peel strength. This calculated peel strength was then evaluated based on the following criteria. A larger peel strength indicates a greater adhesion strength of the electrode.

A: 6 N/m or stronger
B: 5 N/m or stronger to weaker than 6 N/m
C: 4 N/m or stronger to weaker than 5 N/m
D: 3 N/m or stronger to weaker than 4 N/m
E: 2 N/m or stronger to weaker than 3 N/m
F: weaker than 2 N/m (Initial Charge Capacity)

The obtained coin-type batteries were each charged at a constant current to 0.02 V by a 0.1 C constant current constant voltage charging method at 25° C., and the obtained capacity was taken as the initial charge capacity.

(Charge and Discharge Cycle Property)

Each of the obtained coin-type batteries was subjected to a charge and discharge cycle at 25° C. in which the battery was charged at a constant current by a 0.1 C constant current constant voltage charging method and then charged at a constant voltage to 0.02 V, and then discharged at a constant current of 0.1 C to 3.0 V. The charge and discharge cycle was carried out for 50 cycles. The ratio of the discharge capacity at the 50th cycle relative to the initial discharge capacity was taken as the capacity retention ratio. This capacity retention ratio was evaluated based on the following criteria. A larger capacity retention value indicates a smaller decrease in the capacity due to repeated charging and discharging.

A: 80% or larger
B: 75% or larger to smaller than 80%
C: 70% or larger to smaller than 75%
D: 65% or larger to smaller than 70%
E: 60% or larger to smaller than 65%
F: smaller than 60%

Example 1

Production of Negative Electrode Slurry

As carboxymethyl cellulose (CMC), "Daicel 2200" manufactured by Dai-Ichi Kogyo Seiyaku Co., Ltd. was used. An aqueous solution of 1.0% CMC was prepared.

Into a planetary mixer equipped with a disperser, 70 parts of synthetic graphite having a volume mean particle diameter of 24.5 μm as a carbon active material, 30 parts of Si—O—C active material having a volume mean particle diameter of 10 μm as an alloy active material, and 5 parts of acetylene black as a conductive material were placed. The resultant mixture was then stirred for 20 minutes using only a low-speed blade.

Then, 1.0 part in terms of solid content of the aforementioned aqueous solution of 1.0% CMC was added thereto. The solid content was adjusted with ion-exchanged water to 55%, and then the mixture was mixed for 60 minutes at 25° C. Then the solid content of the mixture was adjusted to 52% with ion-exchanged water, and the mixture was mixed for another 15 minutes at 25° C.

Then, as a binder, 1.0 part in terms of solid content of a styrene-butadiene polymer particle aqueous dispersion, which contained 49% butadiene polymerization unit, 47% styrene polymerization unit, and 4% acrylic acid polymerization unit, and had a solid content of 40%, a glass transition temperature of −17° C., a number mean particle diameter of 100 nm, and a pH of 8.5, was added to the mixture. Ion-exchanged water was added thereto for adjusting the final solid content to 48%, and then the mixture was stirred for another 10 minutes. The resultant mixture was subjected to a defoaming treatment under reduced pressure, to obtain a negative electrode slurry having good fluidity.

The evaluation results of the rate of change in the viscosity of the negative electrode slurry are shown in Table 2.

(Battery Production)

The aforementioned negative electrode slurry was applied with a comma coater on one surface of a 20 μm-thick copper foil so that the dried film thickness would become about 200 μm. The slurry was dried for 2 minutes at 60° C. at a rate of 0.5 m/min, and then heat treated for 2 minutes at 120° C. to obtain a raw material electrode. This raw material electrode was rolled with a roll press to obtain a negative electrode having an active material layer thickness of 80 μm and a density of 1.7 g/cm$^3$.

This negative electrode was cut out to have a disc shaped piece having a diameter of 12 mm. On the surface of the active material layer side of this disc-shaped negative electrode, a separator formed of a disc-shaped polypropylene porous film having a diameter of 18 mm and a thickness of 25 μm, metal lithium as the positive electrode, and expanded metal were piled up in this order. This stack was placed in a coin-type outer casing formed of stainless steel equipped with polypropylene packing (diameter 20 mm, height 1.8 mm, stainless steel thickness 0.25 mm). Into the casing, an electrolyte solution was injected so that no air remained in the casing. A stainless steel cap having a thickness of 0.2 mm was fitted on the outer casing via the polypropylene packing for sealing the battery can, to produce a half cell having a diameter of 20 mm and a thickness of about 2 mm.

As the electrolyte solution, a solution obtained by dissolving $LiPF_6$ at a 1 mol/L concentration in a mixed solvent formed by mixing ethylene carbonate (EC) and diethyl carbonate (DEC) in a ratio of EC:DEC=1:2 (volume ratio at 20° C.) was used.

The evaluation results of the performance of this coin-type battery are shown in Table 2. The evaluation results of the negative electrode are also shown in Table 2.

Example 2

A negative electrode slurry, an electrode, and a half cell were produced and evaluated in the same manner as in Example 1, except that silicon particles having a volume mean particle diameter of about 20 μm were used as an active material in place of the Si—O—C active material. The results are shown in Table 2.

Example 3

A negative electrode slurry, an electrode, and a half cell were produced and evaluated in the same manner as in Example 1, except that the added amount of synthetic graphite was 50 parts and the added amount of Si—O—C active material was 50 parts. The results are shown in Table 2.

Example 4

A negative electrode slurry, an electrode, and a half cell were produced and evaluated in the same manner as in Example 1, except that the conductive material was not used. The results are shown in Table 2.

Example 5

A negative electrode slurry, an electrode, and a half cell were produced and evaluated in the same manner as in Example 1, except for using, as a binder, 1.0 part (in terms of solid content) of a styrene-butadiene polymer particle aqueous dispersion containing 49% butadiene polymerization unit, 50.5% styrene polymerization unit, and 0.5% acrylic acid polymerization unit, and having a solid content of 40%, a glass transition temperature of −10° C., a number mean particle diameter of 105 nm, and a pH of 8.5. The results are shown in Table 2.

Example 6

A negative electrode slurry, an electrode, and a half cell were produced and evaluated in the same manner as in Example 1, except for using, as a binder, 1.0 part (in terms of solid content) of a styrene-butadiene polymer particle aqueous dispersion containing 47% butadiene polymerization unit, 50.5% styrene polymerization unit, and 2.5% acrylic acid polymerization unit, and having a solid content of 40%, a glass transition temperature of −8° C., a number mean particle diameter of 97 nm, and a pH of 8.5. The results are shown in Table 2.

Example 7

A negative electrode slurry, an electrode, and a half cell were produced and evaluated in the same manner as in Example 1, except for using, as a binder, 1.0 part (in terms of solid content) of a styrene-butadiene polymer particle aqueous dispersion containing 44% butadiene polymerization unit, 46% styrene polymerization unit, and 10% acrylic acid polymerization unit, and having a solid content of 40%, a glass transition temperature of −5° C., a number mean particle diameter of 150 nm, and a pH of 8.5. The results are shown in Table 2.

Example 8

A negative electrode slurry, an electrode, and a half cell were produced and evaluated in the same manner as in Example 1, except for using, as a binder, 1.0 part (in terms of solid content) of a styrene-butadiene polymer particle aqueous dispersion containing 32% butadiene polymerization unit, 64% styrene polymerization unit, and 4% acrylic acid polymerization unit, and having a solid content of 40%, a glass transition temperature of 10° C., a number mean particle diameter of 98 nm, and a pH of 8.5. The results are shown in Table 2.

Example 9

A negative electrode slurry, an electrode, and a half cell were produced and evaluated in the same manner as in Example 1, except that application of the negative electrode slurry on one surface of a copper foil was performed so that the dried film thickness would become about 80 μm, and the raw material electrode was rolled with a roll press to obtain a negative electrode for use that had a thickness of 140 μm and a density of 1.3 g/cm³. The results are shown in Table 2.

Example 10

A negative electrode slurry, an electrode, and a half cell were produced and evaluated in the same manner as in Example 1, except for using, as a binder, 1.0 part (in terms of solid content) of a styrene-butadiene polymer particle aqueous dispersion containing 49% butadiene polymerization unit, 47% styrene polymerization unit, and 4% itaconic acid polymerization unit, and having a solid content of 40%, a glass transition temperature of −15° C., a number mean particle diameter of 98 nm, and a pH of 8.5. The results are shown in Table 2.

Comparative Example 1

A negative electrode slurry, an electrode, and a half cell were produced and evaluated in the same manner as in Example 1, except that, as the active material, synthetic graphite was not used, and 100 parts of the Si—O—C active material was used instead. The results are shown in Table 2.

Comparative Example 2

A negative electrode slurry, an electrode, and a half cell were produced and evaluated in the same manner as in Example 1, except for using, as a binder, 1.0 part (in terms of solid content) of a styrene-butadiene polymer particle aqueous dispersion that did not contain ethylenically unsaturated carboxylic acid monomer polymerization units, but did contain 50% butadiene polymerization unit and 50% styrene polymerization unit, and had a solid content of 40%, a glass transition temperature of −12° C., a number mean particle diameter of 150 nm, and a pH of 8.0. The results are shown in Table 2.

Comparative Example 3

A negative electrode slurry, an electrode, and a half cell were produced and evaluated in the same manner as in Example 1, except for using, as a binder, 1.0 part (in terms of solid content) of a styrene-butadiene polymer particle aqueous dispersion containing 45% butadiene polymerization unit, 37% styrene polymerization unit, and 18% methacrylic acid polymerization unit, and having a solid content of 40%, a glass transition temperature of 5° C., a number mean particle diameter of 130 nm, and a pH of 8.0. The results are shown in Table 2.

Comparative Example 4

An electrode and a half cell were produced and evaluated in the same manner as in Example 1, except that the added amount of the synthetic graphite was 20 parts and the added amount of the Si—O—C active material was 80 parts. The results are shown in Table 2.

TABLE 1

| | Alloy active material | Carbon active material | Amount of ethylenically unsaturated carboxylic acid monomer polymerization units in binder (wt %) | Parts of conductive material (relative to 100 parts of active material) | Mixing ratio of alloy active material and carbon active material | Electrode density (g/cm³) |
|---|---|---|---|---|---|---|
| Ex. 1 | Si—O—C | Graphite | 4% | 5 | 30:70 | 1.7 |
| Ex. 2 | Si | Graphite | 4% | 5 | 30:70 | 1.7 |
| Ex. 3 | Si—O—C | Graphite | 4% | 5 | 50:50 | 1.7 |
| Ex. 4 | Si—O—C | Graphite | 4% | — | 30:70 | 1.7 |
| Ex. 5 | Si—O—C | Graphite | 0.5% | 5 | 30:70 | 1.7 |
| Ex. 6 | Si—O—C | Graphite | 2.5% | 5 | 30:70 | 1.7 |
| Ex. 7 | Si—O—C | Graphite | 10% | 5 | 30:70 | 1.7 |
| Ex. 8 | Si—O—C | Graphite | 4% | 5 | 30:70 | 1.7 |
| Ex. 9 | Si—O—C | Graphite | 4% | 5 | 30:70 | 1.3 |
| Ex. 10 | Si—O—C | Graphite | 4% | 5 | 30:70 | 1.7 |
| Comp. Ex. 1 | Si—O—C | Graphite | 4% | 5 | 100:0 | 1.7 |
| Comp. Ex. 2 | Si—O—C | Graphite | — | 5 | 30:70 | 1.7 |

TABLE 1-continued

|  | Alloy active material | Carbon active material | Amount of ethylenically unsaturated carboxylic acid monomer polymerization units in binder (wt %) | Parts of conductive material (relative to 100 parts of active material) | Mixing ratio of alloy active material and carbon active material | Electrode density (g/cm³) |
|---|---|---|---|---|---|---|
| Comp. Ex. 3 | Si—O—C | Graphite | 18% | 5 | 30:70 | 1.7 |
| Comp. Ex. 4 | Si—O—C | Graphite | 4% | 5 | 80:20 | 1.7 |

TABLE 2

|  | Adhesion strength of electrode | Charge/ discharge cycle property | Slurry viscosity change rate | Initial charge capacity of coin cell battery (mAh) |
|---|---|---|---|---|
| Ex. 1 | A | A | A | 5.8 |
| Ex. 2 | C | C | B | 10.3 |
| Ex. 3 | C | C | C | 6.6 |
| Ex. 4 | A | C | B | 5.8 |
| Ex. 5 | C | B | C | 5.7 |
| Ex. 6 | A | A | A | 5.8 |
| Ex. 7 | B | C | C | 5.7 |
| Ex. 8 | C | B | B | 5.7 |
| Ex. 9 | A | A | A | 3.8 |
| Ex. 10 | A | A | A | 5.8 |
| Comp. Ex. 1 | F | F | E | 8.9 |
| Comp. Ex. 2 | E | E | F | 5.1 |
| Comp. Ex. 3 | E | E | E | 5.3 |
| Comp. Ex. 4 | E | F | E | 7.5 |

The following can be said based on the results in Tables 1 and 2.

According to the present invention, as shown in Examples 1 to 10, a lithium ion secondary battery having excellent slurry stability, electrode adhesion strength, and cycle property can be obtained by including an alloy active material and a carbon active material in an electrode active material layer that includes an electrode active material and a binder, in which the weight ratio between the alloy active material and the carbon active material is 20:80 to 50:50 and the binder contains 0.1 to 15 wt % of ethylenically unsaturated carboxylic acid monomer polymerization units. Further, among the Examples, Examples 1, 6, and 10, which used a Si—O—C active material as the alloy active material, had a weight ratio between the alloy active material and the carbon active material in the range of 20:80 to 40:60, had a binder whose glass transition temperature is in the range of −80° C. and 0° C., included acrylic acid or itaconic acid polymerization unit in the range of 1 to 5 wt %, and included the conductive material in the range of 1 to 20 wt %, had the best slurry stability, electrode adhesion strength, and cycle property.

On the other hand, when an alloy active material was solely used in the electrode active material layer (Comparative Example 1), when a binder was used that did not contain ethylenically unsaturated carboxylic acid monomer polymerization units (Comparative Example 2), when a binder was used that contained more than 15 wt % of ethylenically unsaturated carboxylic acid monomer polymerization units (Comparative Example 3), and when the weight ratio between the alloy active material and the carbon active material was 80:20 (Comparative Example 4), particularly the peel strength and the charge/discharge cycle property showed a substantial deterioration.

The invention claimed is:

1. A negative electrode for a lithium ion secondary battery comprising: a current collector; and an active material layer which is disposed on the current collector and which contains a negative electrode active material and a binder, wherein:
   the negative electrode active material includes an alloy active material and a carbon active material, the alloy active material comprises $SiO_xC_y$, wherein $0<x\leq3$ and $0<y\leq5$, or silicon, and a weight ratio between the alloy active material and the carbon active material in the active layer is 20:80 to 50:50, and
   the binder contains 0.1 to 15 wt % of an ethylenically unsaturated carboxylic acid monomer polymerization unit.

2. The negative electrode for a lithium ion secondary battery according to claim 1, wherein the active material layer further includes 1 to 20 parts by weight of a conductive material based on 100 parts by weight of the active material.

3. The negative electrode for a lithium ion secondary battery according to claim 1, wherein the binder has a glass transition temperature of 25° C. or lower.

4. The negative electrode for a lithium ion secondary battery according to claim 1, wherein the active material layer has a density of 1.6 to 1.9 g/cm3.

5. A slurry for a lithium ion secondary battery negative electrode comprising a negative electrode active material, a binder, and a solvent wherein:
   the negative active material includes an alloy active material and a carbon active material,
   the alloy active material comprises $SiO_xC_y$ wherein $0<x\leq3$ and $0<y\leq5$ or silicon,
   a weight ratio between the alloy active material and the carbon active material is 20:80 to 50:50, and
   the binder contains 0.1 to 15 wt % of an ethylenically unsaturated carboxylic acid monomer polymerization unit.

6. A lithium secondary battery comprising a positive electrode, a negative electrode, a separator, and an electrolyte solution, wherein the negative electrode is the negative electrode for a lithium ion secondary battery according to claim 1.

* * * * *